United States Patent [19]

Fuchigami et al.

[11] Patent Number: 4,762,654

[45] Date of Patent: Aug. 9, 1988

[54] METHOD FOR MAKING FOAMED ARTICLES HAVING A LAMINATED STRUCTURE

[75] Inventors: Nobuhisa Fuchigami; Takeo Yoshida; Hiroya Fukuda, all of Yokohama, Japan

[73] Assignee: Bridgestone Corporation, Tokyo, Japan

[21] Appl. No.: 927,113

[22] Filed: Nov. 5, 1986

[30] Foreign Application Priority Data

Nov. 5, 1985 [JP] Japan .................. 60-247350

[51] Int. Cl.$^4$ ............. B29C 67/22; B29C 39/18; B29C 39/20
[52] U.S. Cl. ................ 264/45.1; 5/DIG. 2; 249/129; 249/130; 264/45.3; 264/46.4; 264/54; 264/254; 264/255; 264/331.19; 425/817 R; 428/309.9; 428/316.6
[58] Field of Search ............. 264/45.1, 45.8, 54, 264/45.3, 46.4, 255, 254, 331.19; 425/817 R; 249/129, 130; 428/309.9, 316.6; 297/459, DIG. 1; 5/DIG. 2

[56] References Cited

U.S. PATENT DOCUMENTS

| | | | |
|---|---|---|---|
| 2,827,665 | 3/1958 | Rogers, Jr. et al. | 264/54 |
| 3,020,587 | 2/1962 | Alderfer et al. | 264/45.8 X |
| 3,101,244 | 8/1963 | Hood et al. | 264/54 |
| 3,127,457 | 3/1964 | Di Pinto | 264/54 |
| 3,257,149 | 6/1966 | Fruchte et al. | 264/45.1 X |
| 3,320,339 | 5/1967 | Smith | 264/45.1 |
| 3,393,258 | 7/1968 | Fultz et al. | 264/45.1 X |
| 3,423,490 | 1/1969 | Trogdon et al. | 264/45.1 |
| 4,405,681 | 9/1983 | McEvoy | 264/46.4 X |
| 4,541,885 | 9/1985 | Caudill, Jr. | 5/481 X |

FOREIGN PATENT DOCUMENTS

| | | |
|---|---|---|
| 55-96195 | 7/1980 | Japan . |
| 59-138423 | 8/1984 | Japan . |
| 2039506 | 8/1980 | United Kingdom . |

Primary Examiner—Philip Anderson
Attorney, Agent, or Firm—Birch, Stewart, Kolasch & Birch

[57] ABSTRACT

A method for making a foamed article having a laminated structure comprises providing a mold having a cavity therein and a rib vertically mounted from a bottom of the cavity and having a predetermined height to establish at least two blocks on the bottom, and pouring a foamable liquid compositions into the respective blocks in amounts which permit one of the foamable liquid composition to cover the other foamable liquid composition upon foaming whereby the resulting foam has a laminated structure whose boundary between the foamed layers made of the respective foamable liquid compositions is smooth and agreeable to the touch.

16 Claims, 10 Drawing Sheets

METHOD FOR MAKING FOAMED ARTICLES HAVING A LAMINATED STRUCTURE

BACKGROUND OF THE INVENTION

1. Field of the Invention

This invention relates to a method for making foamed articles having a laminated structure which are used as a cushion for automotive sheets and in which foamed layers of different physical properties are integrally combined.

2. Description of the Prior Art

For the satisfaction of a requirement for improving automobiles with respect to the comfort, there has been proposed a seat cushion having a soft foamed layer on one side which contacts the human body and a rigid foamed layer on the opposite side. The seat using this type of cushion is soft to the surface touch and becomes hard as one sits down, ensuring comfort and stability.

The cushion has been made by several methods including a method in which a soft foam and a rigid foam are separately formed or cut and are bonded togther by means of an adhesive, and a method in which a separately formed first layer is set in a mold and a second layer is superimposed on the first layer. However, these method are disadvantageous in that the productivity is low with increasing production costs and when the adhesive is used, the bonded portion becomes hard, so that one will feel a physical disorder when sitting.

Figure 24:
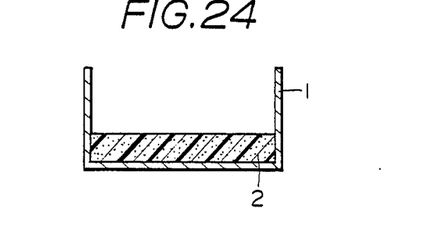
FIGS. 24 through 26 are, respectively, sectional views illustrating a conventional method of making a foamed article.
Figure 25:
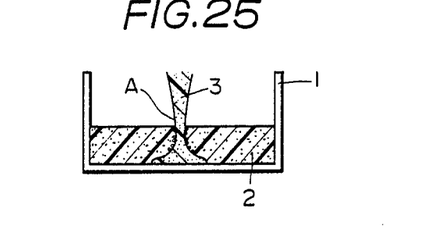
Figure 26:
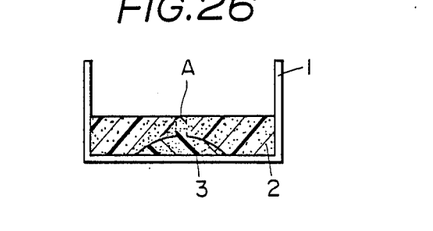

Japanese Patent Application Laid-open Nos. 55-96195 and 59-138423 have proposed methods which can cope with the above problems. These methods comprise, as shown in FIGS. 24 to 26, pouring into a mold 1 a first foamable liquid composition 2 (hereinafter referred simply as first composition) and then a second foamble liquid composition 3 (hereinafter referred to simply as second composition) on the first composition 2 at the time when the first composition 2 is foaming. In this method, the second composition 3 passes through the first composition 2, which is in the course of foaming and has thus a lowered specific density, to the bottom of the mold where it foams.

Since, however, the second composition 3 is poured over the first composition 2 which is foaming, the second composition 3 entrains and mixes with the foaming first composition 2 at the pouring portion A. Accordingly, the resultant product has a mixed layer of a foamed layer 2 of the first composition 2 and a foamed layer 3 of the second composition 3 at the pouring portion A as particularly shown in FIG. 27. The cushion obtained by this method inconveniently gives, more or less, a feeling of physical disorder because the resiliency at the pouring portion A is different from that at the other portions.

Figure 27:
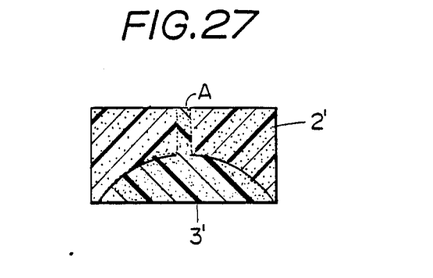
FIG. 27 is a sectional view illustrating the foamed articles obtained according to the method of FIGS. 24 through 26.

Moreover, it is difficult for the second composition 3 poured through the first composition 2 being foamed to spread at the bottom of the mold 1, so that the foamed layer formed from the second composition tends to become thick at the pouring portion A and thinner at a more distant place, resulting in a non-uniform thickness, as shown in FIG. 27. Thus, there is a demand for a cushion which is comfortable to sit down on.

Also, in the above method, the second composition which has been poured into the first composition is compressed by application of foaming pressure of the first composition, so that the foamed layer of the second composition is liable to become harder than desired.

SUMMARY OF THE INVENTION

An object of the invention is to provide a method for making a foamed article having a laminated structure in which the respective foamed layers are smooth and flexible and are integrally bonded together at the boundary thereof.

The above object can be achieved, according to one embodiment of the invention, by a method for making a foamed article having a laminated structure which comprises providing a mold having a cavity therein and a rib vertically mounted from a bottom of the cavity and having a predetermined height to establish at least two blocks on the bottom, and pouring foamable liquid compositions into the respective blocks in amounts which permit one of the foamable liquid compositions to cover the other foamable liquid composition upon foaming whereby the resulting foam has a laminated structure whose boundary between the foamed layers made of the respective foamable liquid compositions is smooth and agreeable to the touch.

According to another embodiment of the invention, there is provided a method for making a foamed article having a laminated structure which comprises setting a mold in such a way that part of a cavity face is inclined, pouring a first foamable liquid composition into the cavity of the mold, and further pouring a second foamable liquid composition from a position, which is above the surface of the first foamable liquid composition, onto the inclined cavity face during a time between the commencement of foaming of the first foamable liquid composition and the completion of the foaming whereby the second foamable liquid composition is permitted to slip under the first foamable liquid composition and is foamed.

More detailedly, the method of the invention according to the first embodiment comprises the following steps:

(1) mounting at least one partition rib vertically from the bottom of a cavity of a mold to form a plurality of blocks on the bottom;

(2) pouring predetermined amounts of different foamable compositions into the respective blocks; and (3) the pouring being effected such that a foamable composition is poured in larger amounts into one block than foamable compositions in the other blocks, so that the foams formed from the composition poured into the one block covers the foam formed from the composition poured into the other blocks.

According to the first embodiment, the cavity of the mold is partitioned with ribs at the bottom thereof and a foamable composition is charged into the partitioned blocks. The foamable compositions in the respective blocks can be arbitratily foamed without a limitation on the foaming at the initial stage. Accordingly, the hardness of the second foamed layer from the second foamable liquid composition which is positioned below the first foamable liquid composition can be readily controlled, so that the final product of a stable quality can be obtained. The respective compositions poured into the respective blocks contact each other in such a state that they are polymerized or formed to an extent and, thus, their mixing is prevented. This is advantageous in that the foamed layers of the respective compositions are bonded together with smooth, flexible boundary layers, ensuring fabrication of a foamed article which is comfortable to sit down on when used as a cushion.

The second embodiment of the invention comprises:

(1) setting a mold in such a way that part of a cavity of the mold is inclined;

(2) pouring a first foamable liquid composition into the cavity of the mold; and (3) pouring a second foamable liquid composition from a position above the surface of the first composition onto the inclined cavity face during a time between commencement of foaming of the first composition and completion of the foaming so that the second composition is permitted to slip under the first composition and is foamed.

According to this embodiment, the second composition which has been poured from the position above the surface of the first composition onto the inclined cavity face passes along the cavity face below the first composition and foams below the first composition. The second composition is not mixed with the first composition and the foamed layers of these two compositions establish a clear interface therebetween. Since the flow along the inclined face is utilized, the second composition smoothly extends at the lower portion of or below the first composition where it foams, so that a foamed layer of the second composition has a uniform thickness. Thus, the final foamed article obtained according to this embodiment has a good laminated structure and is usable as a cushion which is comfortable to sit down on.

BRIEF DESCRIPTION OF THE DRAWINGS

The above and other objects, features and advantages of the present invention will be more clearly understood by the following description with reference to the accompanying drawings in which:

FIGS. 1 through 7 are, respectively, illustrative views of one example for fabricating a foamed article having a laminated structure according to a first embodiment of the invention, in which

FIGS. 8 through 12 are, respectively illustrative views of another example according to the first embodiment of the method of the invention, in which

PREFERRED EMBODIMENTS OF THE INVENTION

Reference is now made to the accompanying drawings in order to describe a method for making foamed articles having a laminated structure according to the invention.

FIGS. 1 through 7 show an example of making a foamed article according to the first embodiment of the invention. In the figures, reference numeral 11 designates a mold. The mold 11 has a rectangular parallelpiped cavity 14 therein. The cavity 14 is closed with a cover 15 as shown by dash and two dots line.

Figure 1:
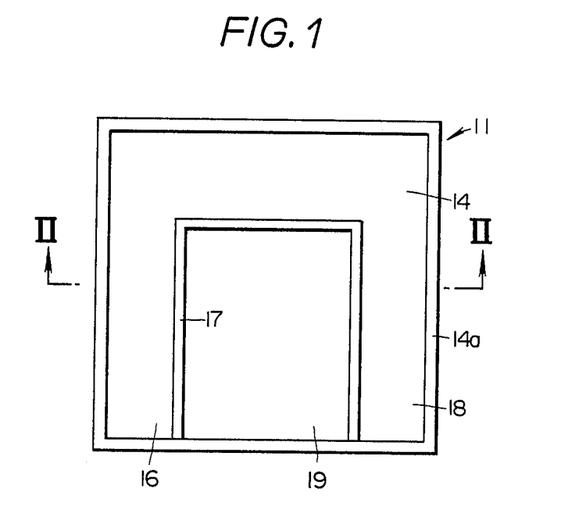
FIG. 1 is a plan view of a mold used in the first embodiment.
Figure 2:
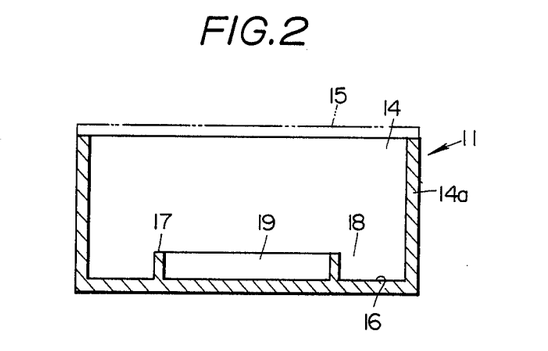
FIG. 2 is a sectional view taken along the line II—II of FIG. 1.

The cavity 14 of the mold 11 has a flat bottom face 16 and is partitioned or separated with a U-shaped rib 17 into a first block 18 and a second block 19 surrounded by the first block 18 except for one side of the block 19. The rib 17 is thinly formed and has its height lower than a side wall 14a of the cavity 14. In addition, the height of the rib 17 is so determined as corresponding to a height at the time when compositions poured to the respective blocks 18, 19 foam to an extent of 20% or more, preferably 20 to 70% of a final degree of foaming. If the height of the rib 17 is set as such, the compositions 20, 21 poured to the respective blocks 18, 19 partitioned with the rib 17 do not overflow the rib 17 into the other block. The compositions 20, 21 contact each other after being polymerized or foamed to an extent and can thus be prevented from mixing with each other.

Figure 3:
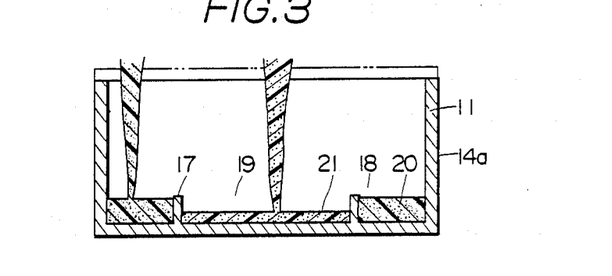
FIG. 3 is a schematic sectional view showing the state of pouring the respective compositions in the mold.

Subsequently, as shown in FIG. 3, a first foamable composition (first composition) 20 is poured into the first block 18 at one side of the mold 11 partitioned by the rib 17 and a second foamable composition (second composition) 21 is poured into the second central block 19. In accordance with the method of this embodiment, the first and second compositions 20 and 21 are so formulated that the foaming rate of the first composition 20 is larger. Moreover, the amounts of the poured first and second compositions 20, 21 are determined such that the first composition 20 is used in larger amounts in order to allow the first composition 20 poured into the first block 28 to foam at a higher speed along the height of the mold 11. In the method of this embodiment, the amount of the first composition 20 poured into the first block is determined in such a way that the height of the first composition 20 in the first block is higher than the height of the second composition 21 poured to the second block 19.

The respecitive compositions 20, 21 may be poured at different timings for pouring and are poured almost simultaneously in this embodiment.

Figure 4:
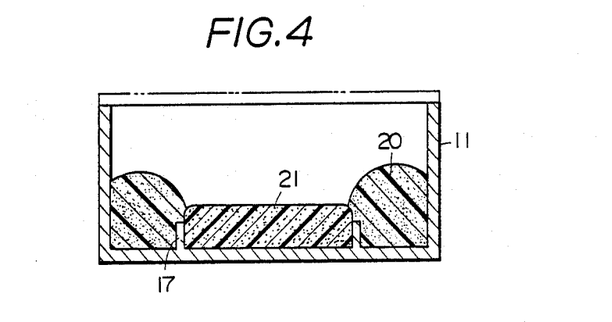
FIGS. 4 and 5 are, respectively, illustrative views of the foaming steps of the respective compositions.
Figure 5:
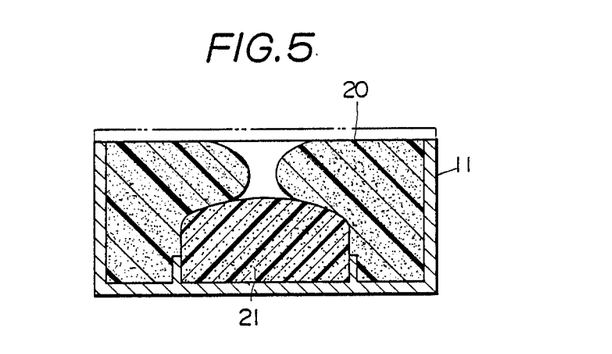
Figure 6:
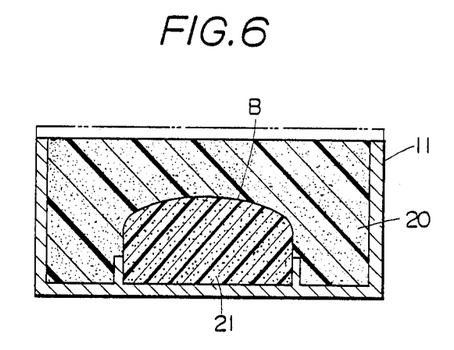
FIG. 6 is a schematic sectional view showing the state of completion of the foaming of the respective compositions and FIG. 7 is a sectional view of a final molding obtained according to the first embodiment.

The poured compositions 20, 21 then start to foam, respectively. When the degrees of foaming of the respective compositions 20, 21 reach 20% or more, preferably 20 to 70% of a final degree of foaming, the compositions 20, 21 overflow the rib 8 and contact with each other. In this embodiment, the first composition 20 which has a faster rate of foaming rises to a higher extent as shown in FIG. 4 and expands to cover the upper surface of the second composition 21 as shown in FIG. 5. Finally, as shown in FIG. 6, the first composition 20 completely covers the second composition 21 and fill the cavity 24. In this manner, the respective compositions 20, 21 have accomplished the foaming reactions, after which the resultant molding is removed from the mold 11 as a foamed article.

Figure 7:
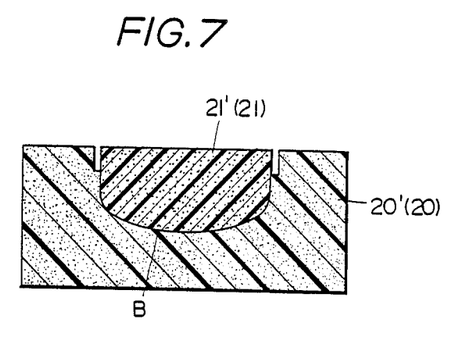

The foamed article has a laminated structure of a first foamed layer 20' of the first composition and a second foamed layer 21' of the second composition 21 as particularly shown in FIG. 7. When the second composition 21 used can give a soft foam, the resultant foamed article is an ideal cushion which is soft to the touch on sitting and which becomes hard as one sits down and can reliably keep the human body in position.

In method of the invention, according to this embodiment, the compositions 20, 21 are, respectively, poured in predetermined amounts into the blocks 18, 19 partitioned by the rib 17 and can thus be freely foamed at the initial foaming stage of the compositions 20, 21. Accordingly, the second foamed layer 21a of the second composition 21 which is below the first composition 20 is readily formed as having a desired degree of hardness, resulting in a foamed article with a stable quality. The first composition 20 and the second composition 21 poured into the respective blocks 18, 19 partitioned by the rib 17 contact after they have been polymerized or foamed to an extent, thus preventing the mixing of the compositions of 20, 21. The first foamed layer 20' of the first composition 20 and the second foamed layer 21' of the second composition 21 are bonded at the boundary face B which is soft.

Since the first composition 20 and the second composition 21 are poured simultaneously into the cavity 14, the foamed article can be produced in a short molding cycle at a high efficiency.

FIGS. 8 through 12 illustrates another example according to the first embodiment of the invention, in which like reference numerals indicate like parts for simplicity.

Figure 8:
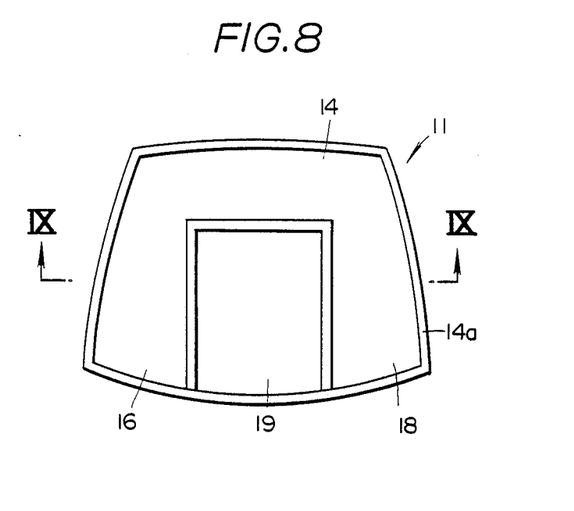
FIG. 8 is a plan view showing a mold used in the second embodiment.
Figure 9:
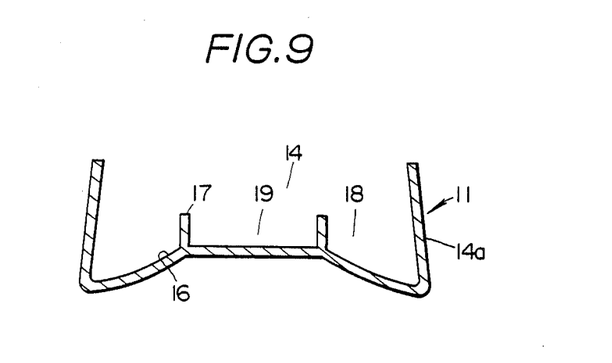
FIG. 9 is a sectional view taken along the line IX—IX of FIG. 8.

In this procedure, the mold 11 is so constructed that the bottom 16 of the cavity 14 gradually descends toward the outside of the rib 17.

Figure 10:
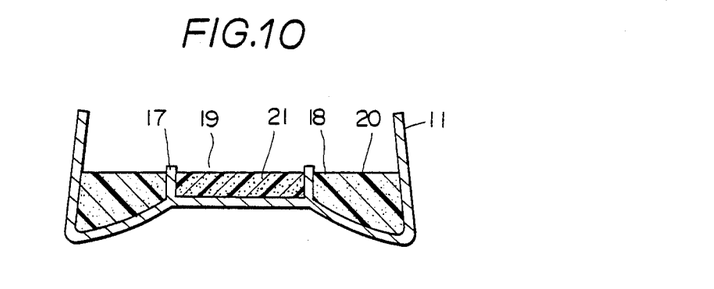
FIG. 10 is a sectional view showing the state of pouring the respective compositions into the mold.
Figure 11:
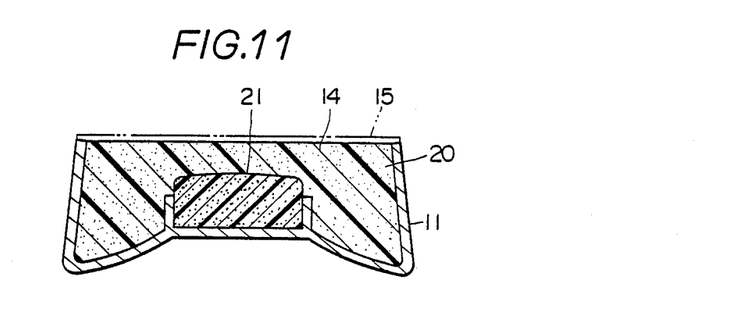
FIG. 11 is a sectional view showing completion of foaming of the respective compositions.

As shown in FIG. 10, the first composition 20 is poured into the first block 18 partitioned by the rib 17 and the second composition 21 is poured into the second block 19.

The poured compositions 20, 21, respectively, start to foam during which the first composition 20 having a higher foaming rate rises faster to cover the upper surface of the second composition 21. Finally, the first composition 20 completely covers the second composition 21 and fills the cavity 14 as particularly shown in FIG. 11. After completion of the foaming reactions of the respective compositions 20, 21, the resultant molding is removed from the mold 11.

Figure 12:
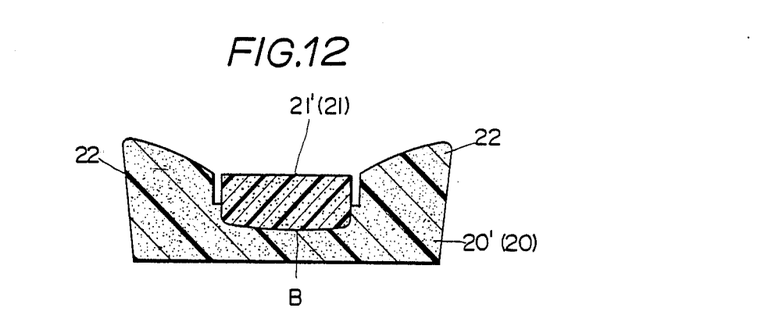
FIG. 12 is a sectional view of a final molding obtained by the method according to the second embodiment of the invention.

In this example, the foamed article obtained has hold portions 22, 22 of the first composition substantially in the form of a triangle at opposite sides of the article as shown in FIG. 12.

In the foregoing embodiments, the mold 11 has only two blocks 18, 19 partitioned at the bottom 16 of the cavity 14, but the mold may be partitioned into more blocks at the bottom thereof.

The respective compositions need not be poured into the respective blocks simultaneously or substantially simultaneously, but after completion of foaming and rising of the first composition, the second composition may be poured. In this case, the molding cycle in prolonged with a lowering of productivity, but it is advantageous in that the boundary B between the foamed layer of the first composition and the foamed layer of the second composition is completely prevented from generation of voids. Moreover, since the first composition poured firstly foams freely, the density lowers with a soft foam being formed. Accordingly, even if the first and second compositions have the same formulation, the first and second foams can have different degrees of hardness.

Figure 13:
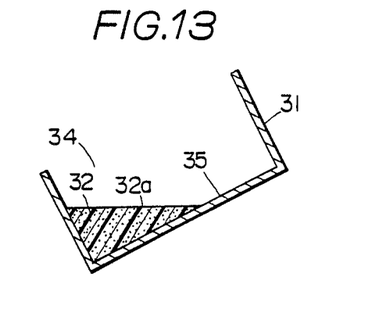
FIGS. 13 through 15 are, respectively, sectional views illustrating one example for making a foamed article having a laminated structure according to a second embodiment of the method of the invention.
Figure 14:
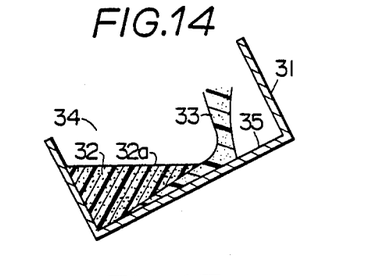
Figure 15:
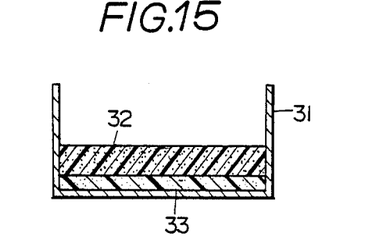

FIGS. 13 through 15 show an example for making a foamed article according to another embodiment of the invention, in which reference numeral 31 indicates a mold. The mold 31 has a cavity 34 of a rectangular parallelpiped form. The cavity 34 is closed with a cover not shown in the figures. The cavity 34 has a flat bottom face which is a part of the inner faces of the cavity 34.

In the procedure of this example, the mold 31 is set such that the bottom face 35 is inclined as shown in FIG. 13. In this condition, a first composition 32 is poured to a lower portion of the cavity 34 where it starts to foam.

Subsequently, a second composition 33 is poured from a position above a surface 32a of the first composition 32 on to the inclined bottom surface 35 as shown in FIG. 14. The second composition 33 may be poured at the time between commencement of foaming of the first composition 32 and completion of the foaming and is preferably at the time when the first composition foams to an extent of from 5 to 90% of a final degree of foaming of the first composition 32.

The thus poured second composition 33 flows down along the bottom 35 under the first composition 32 which is foaming. Because the foaming first composition 32 lowers in apparent specific gravity, the first composition 32 floats on the second composition which has flowed under the first composition.

In some cases, it is possible to increase the difference in specific gravity between the first and second compositions 32 and 33 by adding an inorganic filler to the second composition 33. When the specific gravity of the second composition increases, the second composition 33 can pass below the first composition 32 more smoothly.

After the pouring of the second composition, the mold 31 may be made horizontal, if necessary, as shown in FIG. 15. The compositions 32, 33 are turned horizontal by their fluidity in uniform thicknesses under which they foam.

Figure 16:
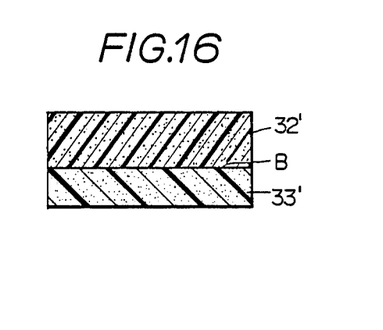
FIG. 16 is a sectional view of the foamed article made by the method of FIGS. 13 through 15.

The foamed article obtained by the above procedure is, as shown in FIG. 16, a laminate of a foamed layer 32' of the first composition 32 and a foamed layer of 33' of the second composition 33 whith a boundary B.

Figure 17:
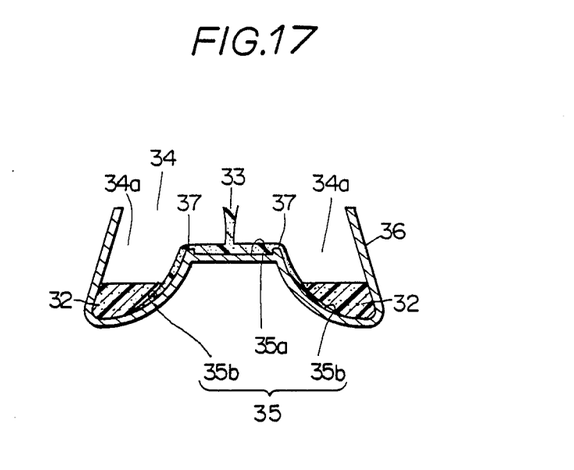
FIG. 17 is a sectional view illustrating another example according to the second embodiment of the method of the invention.

FIG. 17 shows another example according to the second embodiment of the invention in which like reference numerals indicate like parts as in FIGS. 13 through 16.

In this method, the bottom face 35 which is part of the inner faces of the cavity of a mold 36 is formed of a higher central portion 35a and side portions 35b, 35b gradually descending from the central portion 35a.

Slot-forming ribs 37, 37 are formed at bounderies between the central portion 35a and the side portions 35b, 35b.

For the fabrication of a foamed article having a laminated structure by the use of the mold 36, the mold 36 is placed horizontally since the side portions 35b, 35b are both inclined at the bottom 35 of the mold 36.

Figure 18:
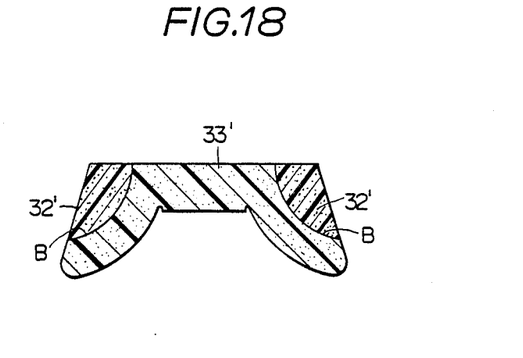
FIG. 18 is a sectional view of a foamed article obtained by the method of FIG. 17.

In this embodiment, the first composition 32 is first poured into side portions 34a, 34a of the cavity 34 of the mold 36 set horizontally. After the first composition has started to foam, the second composition 33 is poured into the central portion 35a in amounts sufficient to overflow the ribs 37, 37, so that the poured second composition 33 passes along the inclined side portions 35b, 35b and is allowed to slip under the first composition 32 at the opposite sides. The resultant foamed article has, as shown in FIG. 18, foamed layers 32', 32' of the first composition 32 substantially in the form a triangle in section at opposite sides thereof and a foamed layer 33' of the second composition 33 ranging from the surfaces of the foamed layers 32', 32' to the central portion.

The present invention is more particularly described by way of examples, which should not be construed as limiting the present invention. Comparative examples are also shown.

EXAMPLE 1

A mold 11 of FIGS. 1 and 2 was first fabricated. The cavity 14 has a depth of 70 mm, a width of 400 mm and a length of 400 mm. The rib 17 of the U-shaped form having a height of 30 mm was vertically provided at the bottom 16 of the mold 11. The second block 19 defined by the rib 17 had a depth of 30 mm, a width of 250 mm and a length of 250 mm.

This mold 11 was set horizontally and 300 g of the second composition 21 was poured into the second block 19. Immediately after the pouring, 500 g of the first composition 20 was poured into the first block. The formulations of the first and second composition 20, 21 are shown in Table 1 below.

TABLE 1

| | (parts by weight) | |
|---|---|---|
| | First Composition (rigid foam) | Second Composition (soft foam) |
| Polyether polyol [V-4702 (Daw Co., Ltd.)] | 60 | 80 |
| Polyether polyol [POP-31-28 (Mitsui Nisso Co., Ltd.)] | 40 | 20 |
| Amine catalyst [DABCILV (Sankyo Aero Products Co., Ltd.)] | 3.0 | 2.0 |
| Silicone [L-5305 (Nippon Unicar Co., Ltd.)] | 1.2 | 1.2 |
| $H_2O$ | 3.0 | 2.5 |
| Tolylene diisocyanate [TDI-80 (Nippon Polyurethane Co., Ltd.)] | 42 | 35 |

The poured first and second compositions 20, 21 were both turned creamy in about 10 seconds and started to foam, but the foaming speed of the second composition 21 was lower than the foaming speed of the first composition 20. At about 5 seconds after the commencement of the foaming, the first composition 20 expanded over the upper end of the rib 7 having the height of 30 mm and the second composition 21 was over the upper end of the rib 7 after 6 seconds.

At that time, the first composition 20 and the second composition 21 were brought to contact, after which the foaming speed of the first composition 20 further increased but the foaming speed of the second composition 21 gradually lowered. As this stage, the cover 15 of the mold 11 was set in position and the mold 11 was closed, followed by allowing to stand for 1 minute at room temperature and placing the mold in an oven at 80° C. for 10 minutes for curing. Thereafter, the cover 15 was removed to obtain a molding.

The thus obtained foamed article was cut so as to check it, revealing that the soft second foamed layer 21' of the second composition 21 was surrounded by the hard first foamed layer 20' of the first composition 20 as shown in FIG. 7.

The boundary B between the foamed layer 20' of the first composition 20 and the foamed layer 21' of the second composition 21 was smooth.

The composition characteristic of the foamed article (foam I) was determined.

For comparison, 800 g of the second composition was poured to the mold 11 to obtain a foam II and 700 g of the first composition 20 was charged to the mold 11 to obtain a foam III, these foams being used for determination of the compression characteristic.

The compression characteristic was determined as a sag factor which was calculated from an initial compression hardness (25% compression hardness) and a final compression hardness (65% compression hardness) of a foam measured by compressing the foam with a disk having a diameter of 200 mm at a rate of 100 mm/minute. The sag factor is a 65% compression hardness/25% compression hardness ratio. A larger ratio results in a cushion with more comfortability to sit down which is soft to the touch on the surface on sitting and becomes harder as one sits down without a final feel to bottoming, ensuring the human body to be firmly supported.

The results of the compression characteristic revealed that the foam article I obtained according to the method of the invention had a sag factor of 3.8 and the foams II and III for comparison had, respectively, sag factors of 3.2 and 3.0. Thus, it was confirmed that by the method of the invention a cushion could be made which had a high sag factor and was thus comfortable to sit down on.

EXAMPLE 2

The mold 11 shown in FIGS. 8 and 9 was used to make an automobile cushion.

The cavity 14 of the mold 11 had a depth of 450 mm, a width of 450 mm and a length of 100 mm with the rib 17 being 30 mm in height. The second block 19 formed by the rib 17 had a depth of 20 mm, a width of 300 mm and a length of 350 mm.

200 g of the second composition 21 was charged into the second block 19 and 900 g of the first composition 20 was charged into the first block 19.

Thereafter, the procedure of Example 1 was repeated to obtain a foamed article as shown in FIG. 12. The sag factor of the foamed article was measured with a value of 4.0.

EXAMPLE 3

The mold 31 of FIG. 13 having the flat bottom 35 was made. The cavity 34 has a depth of 70 mm, a width of 350 mm and a length of 350 mm. The mold 31 was set in such a way that the bottom face was inclined at 15° with respect to the horizontal face. Thereafter, 300 g of the first composition 32 was poured into the lower portion of the cavity 34. The first composition 32 had a formation indicated below. The poured first composition 32 became cream in about 10 seconds and commenced foaming. Ten seconds after the commencement of the foaming, 200 g of the second composition 33 was poured from a portion which was higher than the surface 32a of the first composition on to the bottom 35. The second composition had a formulation indicated below.

After confirmation that the second composition 33 had slipped along the bottom 35 under the first composition, the mold 31 was hermetically closed. Subsequently, the mold 31 was turned horizontal and allowed to stand for 10 minutes at room temperature. The resultant molding was a foamed article having a laminated structure of the foamed layer 32' of the first composition and the foamed layer 33' of the second composition 33.

First Composition (high density foam):

| | |
|---|---|
| Polyether polyol [V-4702 (Daw Co., Ltd.)] | 80 parts by weight |
| Polyether polyol [POP-31-28 (Mitsui-Nisso Co., Ltd.)] | 20 parts by weight |
| Amine catalyst [DABCO 33 LV (Sankyo Aero Products Co., ltd.)] | 2.7 parts by weight |
| Silicone [L-5305 (Nippon Unicar Co., Ltd)] | 1.2 parts by weight |
| $H_2O$ | 2.5 parts by weight |
| Tolylene diisocyanate [TDI-80 (Nippon Polyurethane Co., Ltd.)] | 39 parts by weight |

Second Composition (low density foam):

| | |
|---|---|
| Polyether polyol [V-4702 (Daw Co., Ltd.)] | 80 parts by weight |
| Polyether polyol [POP-31-28 (Mitsui-Nisso Co., Ltd.)] | 20 parts by weight |
| Amine catalyst [DABCO 33 LV (Sankyo Aero Products Co., Ltd.)] | 2.6 parts by weight |
| Silicone [L-5305 (Nippon Unicar Co., Ltd)] | 1.1 parts by weight |
| $H_2O$ | 3.0 parts by weight |
| Tolylene diisocyanate [TDI-80 (Nippon Polyurethane Co., Ltd.)] | 42 parts by weight |

The foamed article was cut for checking, revealing that the foamed layer 32' of the first composition 32 and the foamed layer 33' of the second composition had, respectively, uniform thicknesses and that the boundary B between the foamed layer 32' and the foamed layer 33' was formed as smooth. Thus, it was found that according to the method of the invention, the second composition 33 could be smoothly spread below the first composition, ensuring a foamed article having a good quality.

Figure 19:
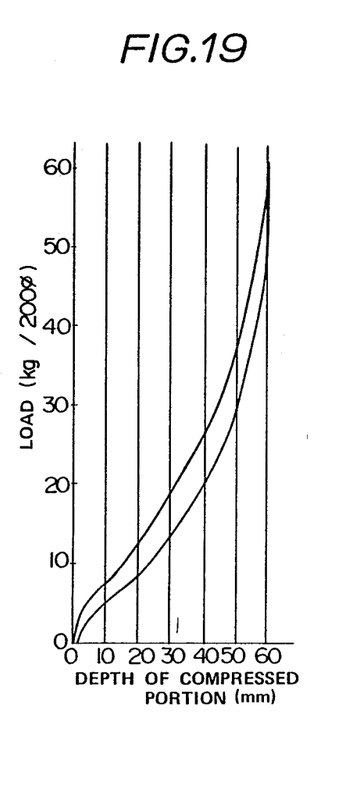
FIGS. 19 through 21 are, respectively, graphs of a compression characteristic of the foamed articles determined in Example 3.
Figure 20:
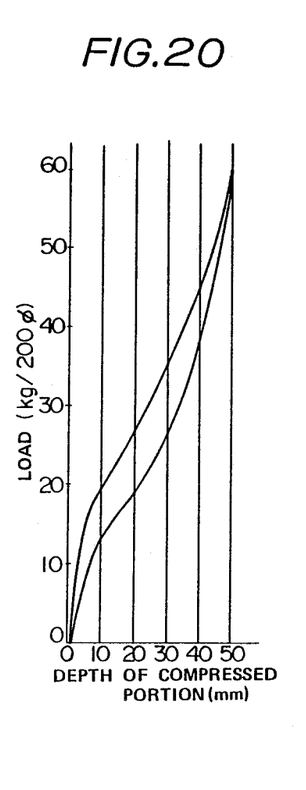
Figure 21:
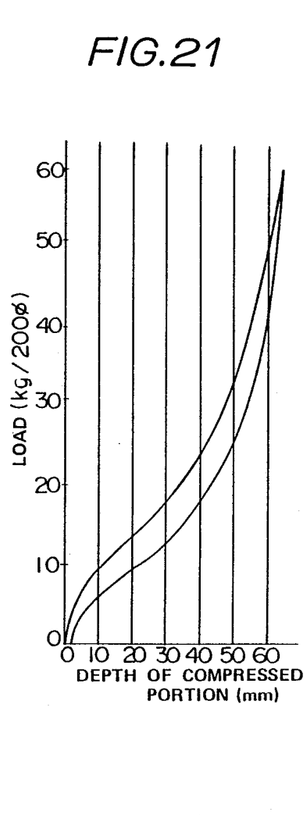

The foamed article obtained above (foam VI) was subjected to measurement of a compression characteristic. For comparison, 500 g of the first composition 32 was poured into the mold 31 to obtain a foam IV and 500 g of the second composition 33 was poured into the mold 31 to obtain a foam V. These foams were also subjected to measurement of the compression characteristic. The compression characteristic was determined by compressing the respective foams with a compression disk having a diameter of 200 mm and check the relation between a degree of deformation of the foam and a compression force. The compression characteristic of the foam VI was determined such that the compression disk was contacted against the foamed layer 33' of the second composition. The characteristic of the foam VI obtained according to the method of the invention is shown in FIG. 19, that of the foam IV is shown in FIG. 20 and that of the foam V is shown in FIG. 21.

From the results of the compression characteristic, an initial compression hardness (25% compression hardness), a final compression hardness (65% compression hardness) and a sag factor were determined. The results are summarized in Table 2 below.

TABLE 2

| | Density g/cm$^2$ | 25% Compression Hardness kg/200φ | 65% Compression Hardness kg/200φ | Sag factor |
|---|---|---|---|---|
| Foam IV | 0.0590 | 30 | 85 | 2.8 |
| Foam V | 0.0432 | 14.5 | 46 | 3.2 |
| Foam VI | — | 15 | 57 | 3.8 |

As will be clear from the above results, the method of the invention is effective in making a cushion which has a large sag factor and is thus comfortable to sit down.

EXAMPLE 4

The general procedure of Example 3 was repeated except that 50 parts by weight of barium sulfate was added to 200 parts by weight of the second composiiton to increase the specific gravity, thereby making a foam.

The foam had a sag factor of 4.5 which was larger than 3.8 of the foam VI obtained in Example 3. The second composition 33 in this example could smoothly slip under the first composition and the resulting foam had a better laminated structure.

Comparative Example 1 a mold of the same type as used in Example 3 and the first and second composition used in Example 3 were subjected to molding of a foam according to the known method described in Japanese Patent Application Laid-open No. 55-96195. More particularly, the mold was placed horizontally and the first composition was first poured into the cavity of the mold and then the second composition was further charged over the first composition which was foaming. The time when the second composition was charged was similar to the case of Example 3.

The resultant foam was divided into two pieces to check the section, revealing that, as shown in FIG. 27, a foamed layer 3' of the second composition 3 was formed below a foamed layer 2' of the first composition 2 in the form of a dome. At the portion A at which the second composition 3 had been poured, there was observed a mixture of the first and second compositions 2, 3.

Comparative Example 2

Figure 22:
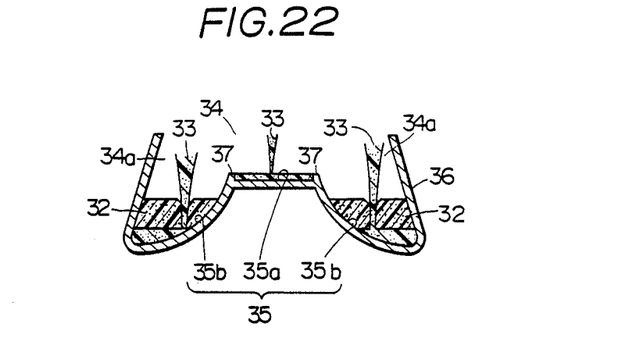
FIG. 22 is a sectional view illustrating a conventional method used in Comparative Example 1.

The mold 36 shown in FIG. 17 was used to make a foam according to the known method described in Japanese Patent Application Laid-open No. 55-96195. The first composition 32 was charged into the opposite side portions 34a, 34a of the cavity 34, after which, as shown in FIG. 22, the second composition 33 was poured over the first composition 32 at the side portions 34a, 34a and was also poured at the central portion 35a in amounts not overflowing from the ribs 37, 37.

Figure 23:
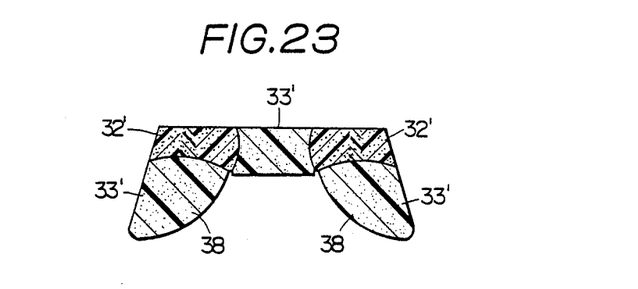
FIG. 23 is a sectional view of a foamed article obtained in Comparative Example 2.

The resultant foam was comprised of the foamed layers 32', 32' of the first composition 32 substantially in the form of a rectangular parallelpiped form in section at opposite sides of the foam and the foamed layer 33', 33' of the second composition 33 as projections 38, 38 at opposite sides. Thus, the foam had not a good laminated structure.

What is claimed is:

1. A method for making a cushion for automotive seats having a laminated structure of polyurethane foams which comprises: providing a mold having a cavity therein and a rib vertically mounted from a bottom of the cavity and having a predetermined height to establish at least two blocks on the bottom; and pouring foamable liquid compositions for making polyurethane foams into the respective blocks in amounts which permit one of the foamable liquid compositions to cover the entire surface of the other foamable liquid composition upon foaming whereby the resulting foam has a laminated structure of polyurethane foams whose boundary between the respective polyurethane foam layers is smooth and agreeable to the touch.

2. A method according to claim 1, wherein said rib is in the form of a U shape connected to one wall face of the mold at the free ends of the U shape and the other foamable liquid composition is charged into the block surrounded by the rib in an amount smaller than the one foamable liquid composition.

3. A method according to claim 1, wherein the height of the rib is determined such that when the foamable liquid compositions foam to an extent of 20% or more of a final degree of foaming of the foamable liquid compositions, they reach the height of the rib.

4. A method according to claim 1, wherein the one foamable liquid composition has a higher foaming speed than the other foamable liquid composition.

5. A method according to claim 1, wherein the bottom of the cavity has, in section, a central flat portion and inclined portions descending from the central flat portion at opposite sides of the bottom, and the rib of the U shape is vertically mounted on the central flat portion.

6. A method according to claim 5, wherein the one foamable liquid composition is charged into the inclined portions.

7. A method for making a cushion for automobile seats having a laminated structure of polyurethane foams which comprises setting a mold in such a way that part of a cavity face is inclined, pouring a first foamable liquid composition for making polyurethane foam into the cavity of the mold, and further pouring a second foamable liquid composition for making another polyurethane foam from a position, which is above the surface of the first foamable liquid composition, onto the inclined cavity face during a time between the commencement of foaming of the first foamable liquid composition and the completion of the foaming whereby the second foamable liquid composition is permitted to slip under the first foamable liquid composition and is foamed to obtain a foam having a laminated structure of polyurethane foams in which a polyurethane foam layer obtained from the first foamable liquid composition covers the surface of another polyurethane foam layer obtained from the second foamable liquid composition.

8. A method according to claim 7, wherein said mold has, in section, a flat central portion having a rib to form a first block and inclined side portions descending from the central portion to form a second block with surrounding wall faces of the mold, and the second liquid composition is poured into the first block as overflowing the rib and slips under the first liquid composition in the second block along the inclined portions.

9. A method according to claim 7, wherein said second composition has an inorganic filler to increase the specific gravity of the composition.

10. A method according to claim 7, wherein the cavity of the mold has a flat bottom face, the mold is set such that the bottom face is inclined to pour the first and second foamable liquid composition and the mold is held such that the bottom face becomes horizontal after completion of the pouring of the second liquid composition.

11. A method according to claim 1, wherein the one foamable liquid composition forms a hard or high density polyurethane foam and the other foamable liquid forms a soft or low density polyurethane foam, and the resulting foam has a laminated structure in which the entire surface of the soft or low density polyurethane foam is covered with the hard or high density polyurethane foam.

12. A method according to claim 7, wherein the first foamable liquid composition forms a hard or high density polyurethane foam and the second foamable liquid forms a soft or low density polyurethane foam, and the resulting foam has a laminated structure in which the entire surface of the soft or low density polyurethane foam is covered with the hard or high density polyurethane foam.

13. A method according to claim 7, wherein when said second foamable liquid composition is poured, it has a specific gravity higher than the specific gravity of said first foamable liquid composition.

14. A method according to claim 13, wherein said first foamable liquid composition forms a soft polyurethane foam and said second foamable liquid composition forms a hard polyurethane foam.

15. A method according to claim 1 or 8 which further comprises removing the laminated structure from said mold cavity including said rib.

16. A method for making a cushion for automobile seats having a laminated structure of polyurethane foams which comprises setting a mold in such a way that part of a cavity face is inclined, pouring a first foamable liquid composition for making polyurethane foam into the cavity of the mold, and further pouring a second foamable liquid composition for making another polyurethane foam from a position, which is above the surface of the first foamable liquid composition, onto the inclined cavity face during a time between the commencement of foaming of the first foamable liquid composition and the completion of the foaming wherein when said second foamable liquid composition is poured, it has a specific gravity higher than the specific gravity of said first foamable liquid composition whereby the second foamable liquid composition is permitted to slip under the first foamable liquid composition and is foamed to obtain a foam having a laminated structure of polyurethane foams in which a polyurethane foam layer obtained from the first foamable liquid composition covers the entire surface of another polyurethane foam layer obtained from the second foamable liquid composition.

* * * * *